US010726522B2

United States Patent
Stec et al.

(10) Patent No.: US 10,726,522 B2
(45) Date of Patent: Jul. 28, 2020

(54) METHOD AND SYSTEM FOR CORRECTING A DISTORTED INPUT IMAGE

(71) Applicant: FotoNation Limited, Galway (IE)

(72) Inventors: Piotr Stec, Galway (IE); Vlad Georgescu, Brasov (RO)

(73) Assignee: FotoNation Limited, Galway (IE)

( * ) Notice: Subject to any disclaimer, the term of this patent is extended or adjusted under 35 U.S.C. 154(b) by 0 days.

(21) Appl. No.: 15/879,310

(22) Filed: Jan. 24, 2018

(65) Prior Publication Data

US 2019/0228502 A1    Jul. 25, 2019

(51) Int. Cl.
  *G06T 3/40* (2006.01)
  *G06T 5/00* (2006.01)

(52) U.S. Cl.
  CPC .............. *G06T 3/4007* (2013.01); *G06T 5/00* (2013.01); *G06T 5/001* (2013.01); *G06T 5/006* (2013.01); *G06T 2200/28* (2013.01); *G06T 2207/20021* (2013.01)

(58) Field of Classification Search
  CPC ..... G06T 3/4007; G06T 3/4015; G06T 3/403; G06T 3/40; G06T 9/007; G06T 1/20; G06T 2207/10024; G06T 2207/20192; G06T 5/003; G06T 7/13; G06T 2207/10004; G06T 2207/20021; G06T 5/006; H04N 5/217; H04N 5/23229; H04N 7/01; H04N 9/045; G02B 21/008; G06K 2009/4666; G06K 9/46; G06K 9/4604
  See application file for complete search history.

(56) References Cited

U.S. PATENT DOCUMENTS

| 6,628,330 B1* | 9/2003 | Lin ...................... G06T 3/4007 348/252 |
| 2010/0111440 A1* | 5/2010 | Chai .................... G06T 3/0018 382/275 |
| 2014/0009568 A1 | 1/2014 | Stec et al. |

(Continued)

FOREIGN PATENT DOCUMENTS

| EP | 3101622 A2 | 12/2016 |
| WO | 2010/051147 A2 | 5/2010 |
| WO | 2017/198861 A1 | 11/2017 |

OTHER PUBLICATIONS

YUV, Wikipedia, Dec. 2, 2017 (Year: 2017).*

(Continued)

*Primary Examiner* — Ming Wu
(74) *Attorney, Agent, or Firm* — Lee & Hayes, PC

(57) ABSTRACT

A method for correcting an image divides an output image into a grid with vertical sections of width smaller than the image width but wide enough to allow efficient bursts when writing distortion corrected line sections into memory. A distortion correction engine includes a relatively small amount of memory for an input image buffer but without requiring unduly complex control. The input image buffer accommodates enough lines of an input image to cover the distortion of a single most vertically distorted line section of the input image. The memory required for the input image buffer can be significantly less than would be required to store all the lines of a distorted input image spanning a maximal distortion of a complete line within the input image.

13 Claims, 8 Drawing Sheets

(56) References Cited

U.S. PATENT DOCUMENTS

| | | | | |
|---|---|---|---|---|
| 2015/0228077 A1* | 8/2015 | Menashe | ................ | G06K 9/52 |
| | | | | 382/103 |
| 2015/0248000 A1* | 9/2015 | Hayashi | ............... | G06T 3/4015 |
| | | | | 348/80 |
| 2015/0262344 A1* | 9/2015 | Stec | ....................... | G06T 5/006 |
| | | | | 382/275 |
| 2016/0035104 A1* | 2/2016 | Bigioi | ............... | H04N 5/23254 |
| | | | | 348/208.1 |

OTHER PUBLICATIONS

Bigioi, et al., U.S. Appl. No. 62/592,665, filed Nov. 30, 2017, titled "Peripheral processing device."

Bigioi, U.S. Appl. No. 62/552,592, filed Aug. 31, 2017, titled "Peripheral processing device."

EPO International Searching Authority: "International Search Report and Written Opinion" of International Application No. PCT/EP2019/050302 filed Jan. 8, 2019; Search Report completed Feb. 13, 2019 and dated Feb. 22, 2019, 15 pages.

Pavel Zemcik et al: "Accelerated image resampling for geometry correction", Journal of Real-Time Image Processing, vol. 8, No. 4, Dec. 1, 2013, pp. 369-377, XP055556272, DE, ISSN: 1861-8200, DOI: 10.1007/s11554-011-0213-x.

* cited by examiner

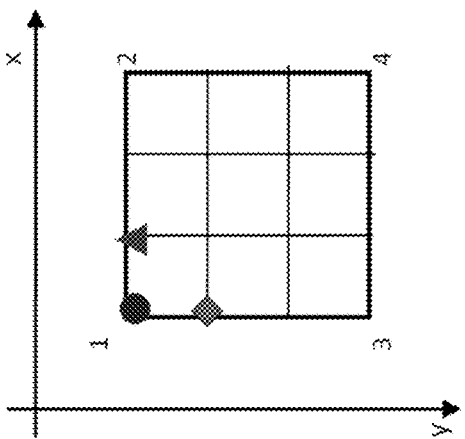
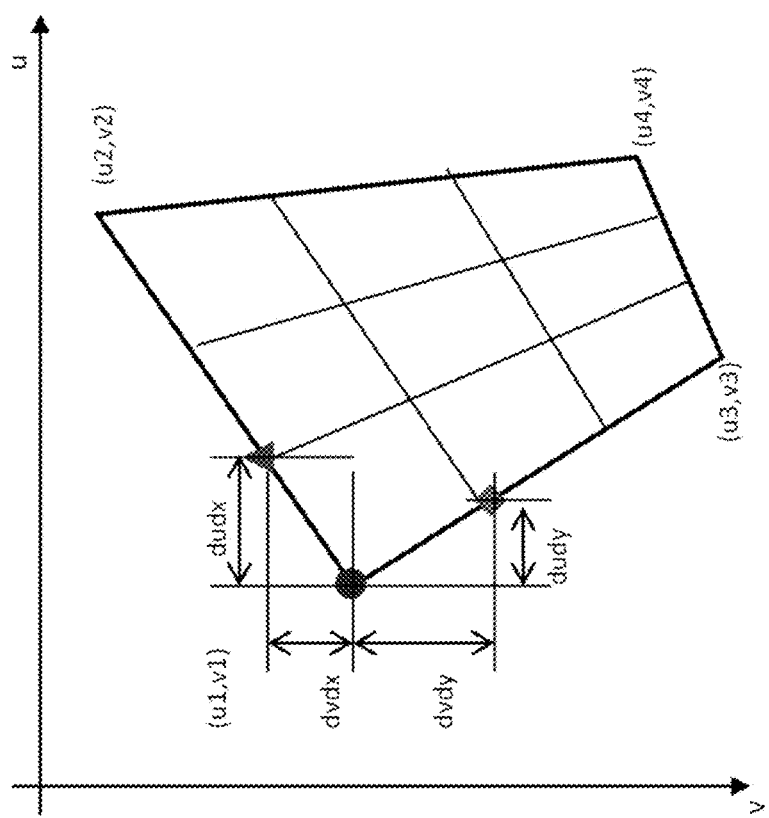
Figure 4

METHOD AND SYSTEM FOR CORRECTING A DISTORTED INPUT IMAGE

FIELD

The present invention relates to a method and system for correcting a distorted input image.

BACKGROUND

EP3101622 (Ref: FN-384-EP2), the disclosure of which is herein incorporated by reference, discloses a method for correcting a distorted input image stored in memory comprising dividing a local region of the image to be displayed into a grid of rectangular tiles, each tile corresponding to a distorted tile with a non-rectangular boundary within said input image. For each tile of the local region, maximum and minimum memory address locations of successive rows of said input image sufficient to span said boundary of said distorted tile are determined. Successive rows of the distorted input from between said maximum and minimum addresses are read. Distortion of the non-rectangular portion of said distorted input image is corrected to provide a tile of a corrected output image which is stored.

While the distortion correction approach of EP3101622 is useful in many applications, it could also be useful for a distortion correction engine (DCE) (referred to as a Geometrical Distortion Engine (GDE) in EP3101622) in addition or as an alternative to receive image information directly from an image signal processor (ISP) and to correct for example, lens distortion, as such an image is being written to system memory for subsequent processing. One example, of such subsequent processing comprises processing by a neural network such as disclosed in U.S. Patent Application Nos. 62/592,665 & 62/552,592 (Ref: FN-618-USP2) to detect and possibly classify regions of interest within an image.

Providing such a DCE typically requires an input image buffer for storing a plurality of rows (lines) of the input image. Output image pixels can then be produced from the buffered lines to take into account the distortion of the input image.

FIG. 1 shows a grid illustrating lens distortion of an input image. Typically, the memory requirement for an input image buffer is dependent on the image row with maximum curvature due to distortion. In the case of the lens distortion of FIG. 1, maximum distortion occurs along the image rows corresponding with the top-most grid line GL1 and bottom grid line GL7. Thus, one approach would be to provide an input buffer sufficient to store image information for L2-L1 rows. While such an approach could be simple from a control point of view, it requires a relatively large input buffer, and this could add significantly to the cost of implementing such functionality.

It is an object of the present application to provide an improved system and method for correcting such a distorted input image.

SUMMARY

According to the present invention there is provided a method for correcting a distorted input image according to claim 1.

In a further aspect, there is provided a system configured to perform the method of claim 1.

Embodiments divide an output image into a grid with vertical sections of width smaller than the image width but wide enough to allow efficient bursts when writing distortion corrected line sections into memory. In the embodiment, such bursts comprise 256 pixels of information.

Embodiments based on this approach include a distortion correction engine including a relatively small amount of memory for an input image buffer but without requiring unduly complex control. The input image buffer accommodates enough lines of an input image to cover the distortion of a single most vertically distorted line section of the input image. In a significantly distorted image, as is common for mobile devices such as smartphones, the memory required for the input image buffer can be significantly less than would be required to store all the lines of a distorted input image spanning a maximal distortion of a complete line within the input image.

For example, where a conventional approach could require 250 input image lines to be stored, approaches using the present teaching with a grid comprising 8 vertical sections might require only 40 lines for the input image buffer—thus, over 6 times less memory could be required or instead of 1.8 MB for a typical image, only 300 kB would be required.

The order in which vertically divided sections of any given distorted line are processed need not be regular and is determined according to the distortion of the input image. This distortion is defined with an at least partially cached grid definition. The grid cache can respond to an indication of an image row (line) which has been read by the distortion correction engine to provide a distortion correction core with the information it needs to output a sequence of distortion corrected pixel values for a line section which can be subsequently written in efficient bursts to memory, so building up an output image, section by section.

In embodiments, each vertical section is divided into an array of tiles, each derived from a distorted tile of the input image with potentially different distortion characteristics, and the width of a section is preferably an integer multiple of the tile width. So, once a row for an image sufficiently below a lowest coordinate for a tile of a section of distorted line in an input image has been read, the identified line section can be processed to produce a corrected line section within an output image. Where bilinear or equivalent interpolation is being used to generate output image information, then one row below the lowest coordinate for a tile of a section of distorted line in an input image needs to be read in order to enable to pixel information for bottom row of a tile to be generated. Where bicubic or equivalent interpolation is being used to generate output image information, then two rows below the lowest coordinate for a tile of a section of distorted line in an input image are needed.

Once a line section is identified for processing, the grid cache can provide descriptors for the tiles of the line section to the distortion correction core to enable the distortion correction core to generate a distortion corrected line section.

As they both only require a relatively limited size buffer memory, as well as using common buffer addressing and resampling techniques, embodiments of the invention can be implemented as extensions to the functionality of systems such as disclosed in EP3101622 (Ref: FN-384-EP2), enabling such systems to switch between applying distortion correction to an image stored in memory and to an image as it is being read from an image signal processor (ISP) but without significantly increasing the footprint of the system.

BRIEF DESCRIPTION OF THE DRAWINGS

An embodiment of the invention will now be described, by way of example, with reference to the accompanying drawings, in which:

FIG. 4 illustrates the relationship between a distorted tile of an input image and the corresponding tile of an output image;

DESCRIPTION OF THE EMBODIMENT

Figure 1:
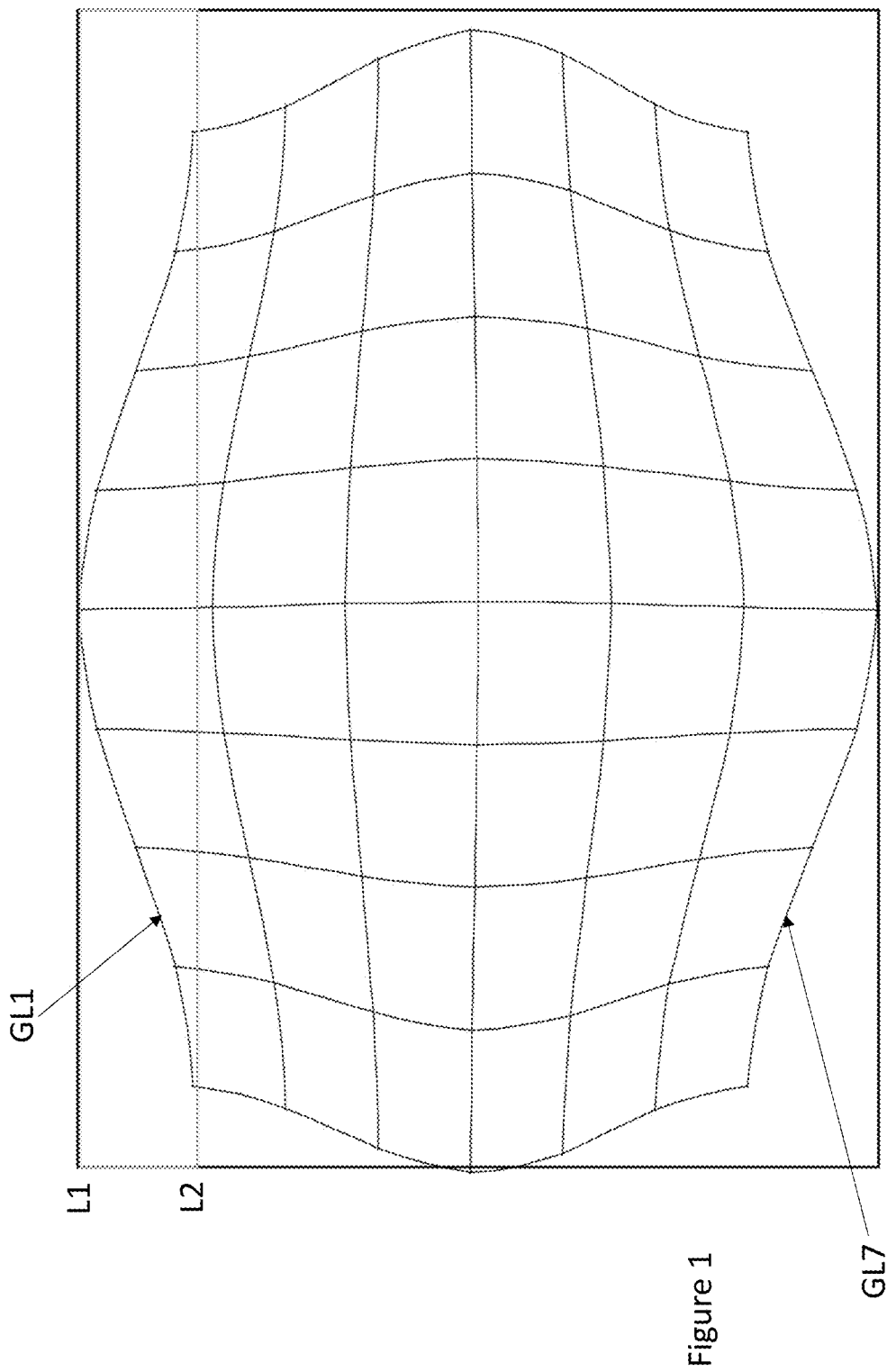
FIG. 1 shows an exemplary distorted image of the type to be corrected by embodiments of the present invention.
Figure 2:
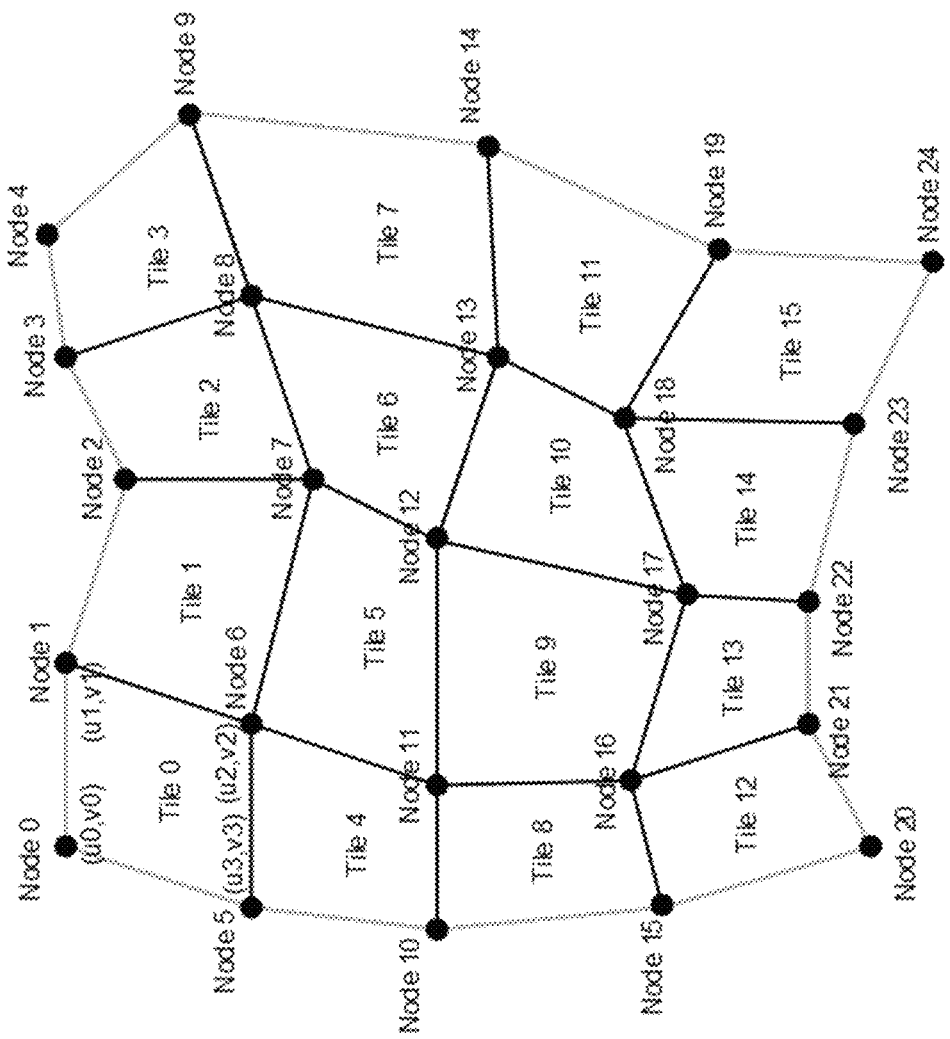
FIG. 2 illustrates a region of tiles grouped into a macroblock.
Figure 7:
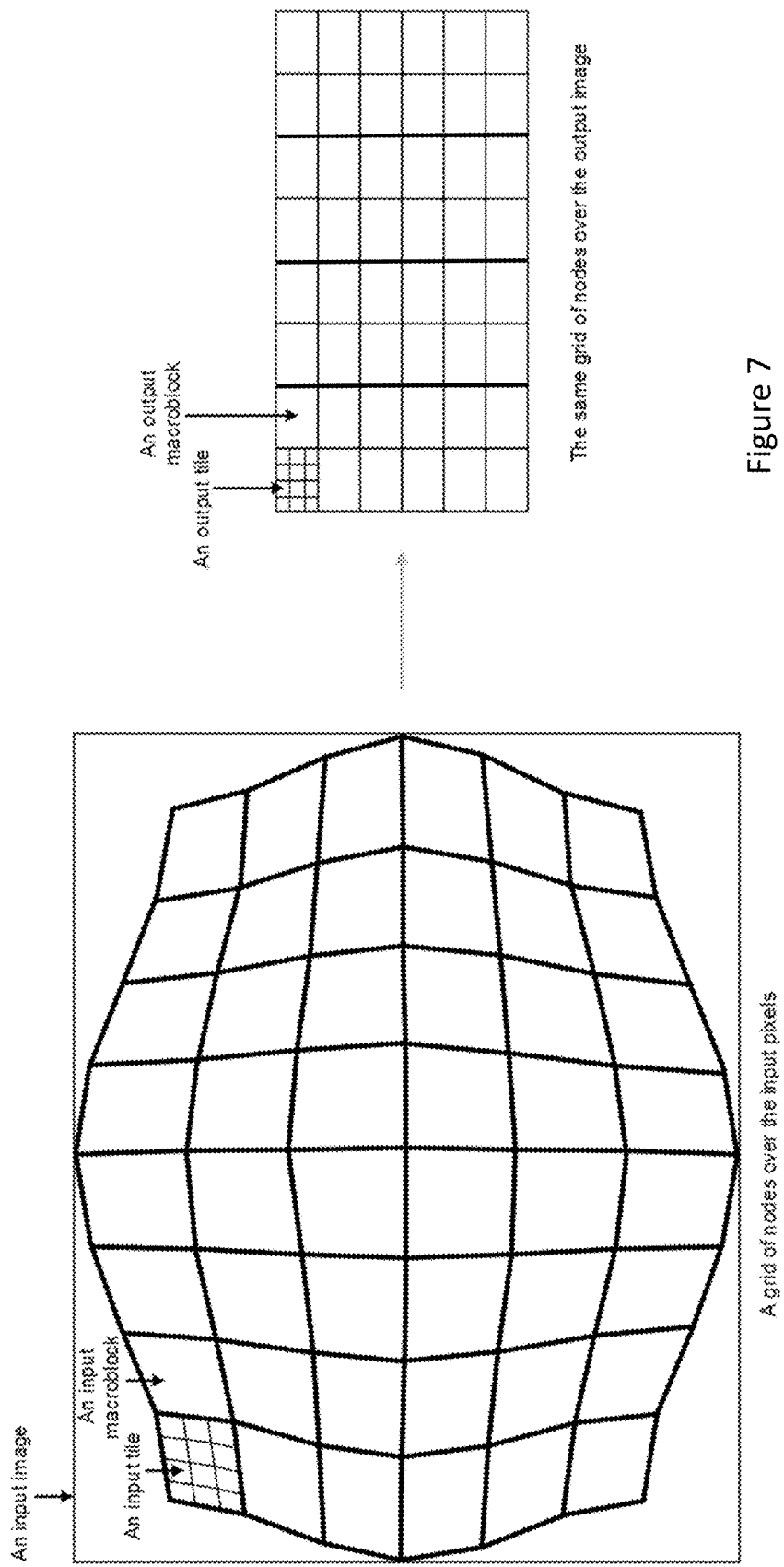
FIG. 7 illustrates the relationship between tiles in a distorted input image and corresponding tiles of a corrected output image.

Referring now to FIG. 2, as in EP3101622 (Ref: FN-384-EP2), embodiments of the present invention are based on dividing an image into tiles where the pixels of any given image tile share a common distortion. In the embodiment, each tile is defined by four nodes representing the corner coordinates for the tile. In the present description, parameters (u,v) indicate distorted input image coordinates, whereas parameters (x,y) indicate corrected output image pixel locations i.e. u,v coordinates indicating a distorted location in an input image of an output image pixel at location x,y will tend not to coincide with an input image pixel location. In the example of FIG. 2, a region of 4×4 tiles is grouped into a macroblock bounded by nodes 0 . . . 4, 9, 14, 19, 24 . . . 20, 15, 10 and 5 whereas in the example of FIG. 7, macroblocks comprise 4×3 tiles. In any case, regions of macroblocks in turn form a grid defining the distortion for an image. In the examples described later, image space is divided into a number of vertical sections, each section being 2 macroblocks in width.

Figure 3:
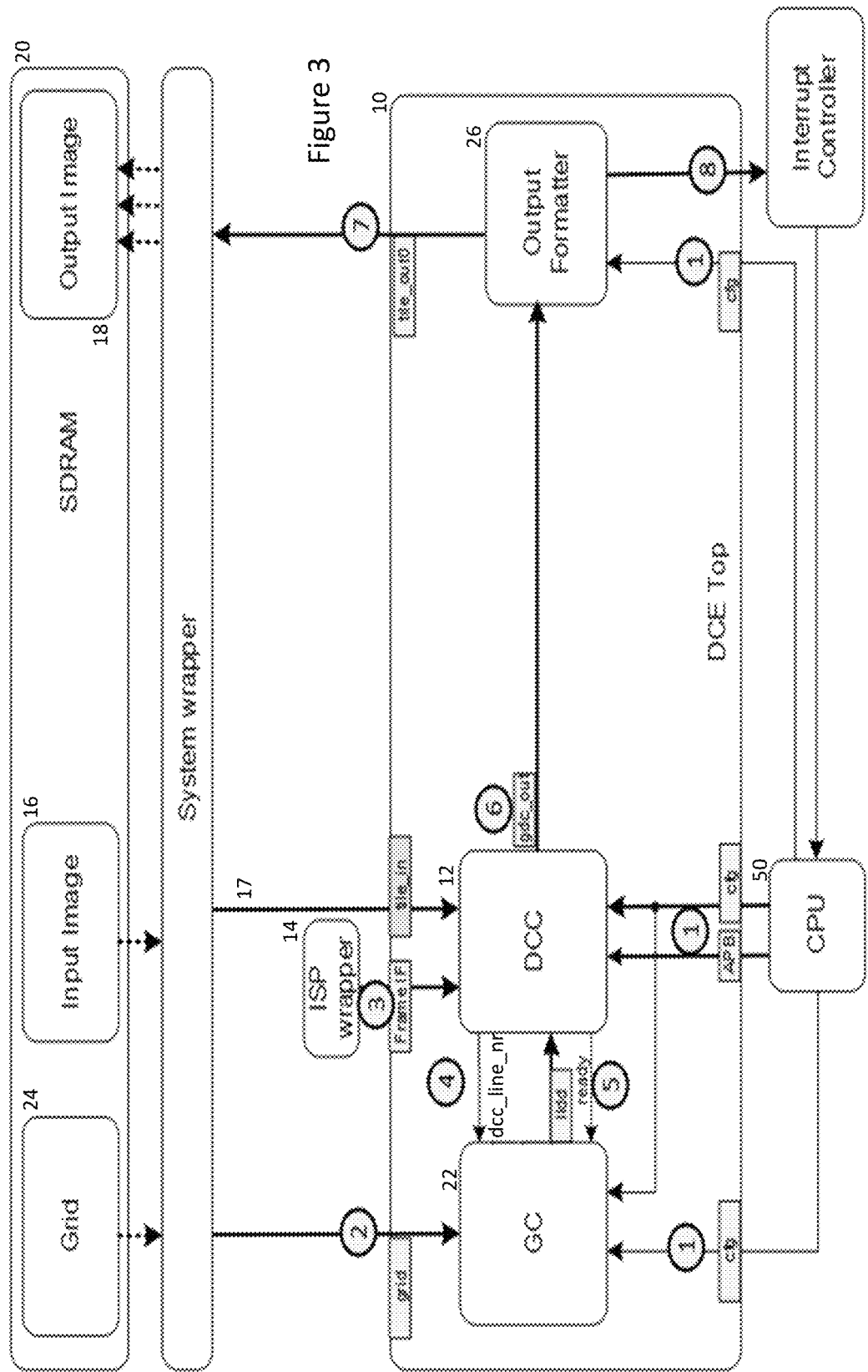
FIG. 3 illustrates an architecture for a system for correcting a distorted input image according to an embodiment of the present invention.

Referring now to FIG. 3, there is shown a system for correction of an acquired image according to an embodiment of the present invention.

The system comprises a distortion correction engine (DCE) 10 whose components may comprise only the functionality described in the present application or the functionality of the components described herein may be added where required to the corresponding components of the graphics distortion engine (GDE) of EP3101622 (Ref: FN-384-EP2), although as will be described later, it will be seen that the functionality of some components of the present system such as the addresser and re-sampler is substantially common with those elements of the GDE of EP3101622 (Ref: FN-384-EP2).

At the core of the DCE 10 is a distortion correction core (DCC) 12 corresponding to the geometrical distortion core (GDC) of EP3101622 (Ref: FN-384-EP2) except that, in addition or as an alternative, the DCC 12 is fed directly with input image information from an image signal processor (ISP) in an ISP wrapper 14. Essentially the ISP wrapper provides line by line information for the image to the DCC where it is stored in a rolling buffer 32 discussed in more detail in relation to FIG. 5.

Note that for clarity, the first received row of an image is referred to as a top row and the image is referred to as being read from top to bottom. However, it will be appreciated that the terms top/bottom are used only for clarity and need not correspond with the spatial arrangement of an image and for example, the first image line read could correspond with the bottom of an image scene.

Where the DCC 12 is to provide the operating mode described in EP3101622 (Ref: FN-384-EP2), then extended tiles from an input image 16 are read through a separate interface 17 where they are stored in the buffer 32 while a corrected tile is generated and then written as part of an output image 18 in memory 20—in this case SDRAM. This mode is not described further in the present specification.

In any case, in the embodiment, communications between the DCE 10 and memory 20 can take place over a system bus, such as for example, an AXI interface.

Figure 5:
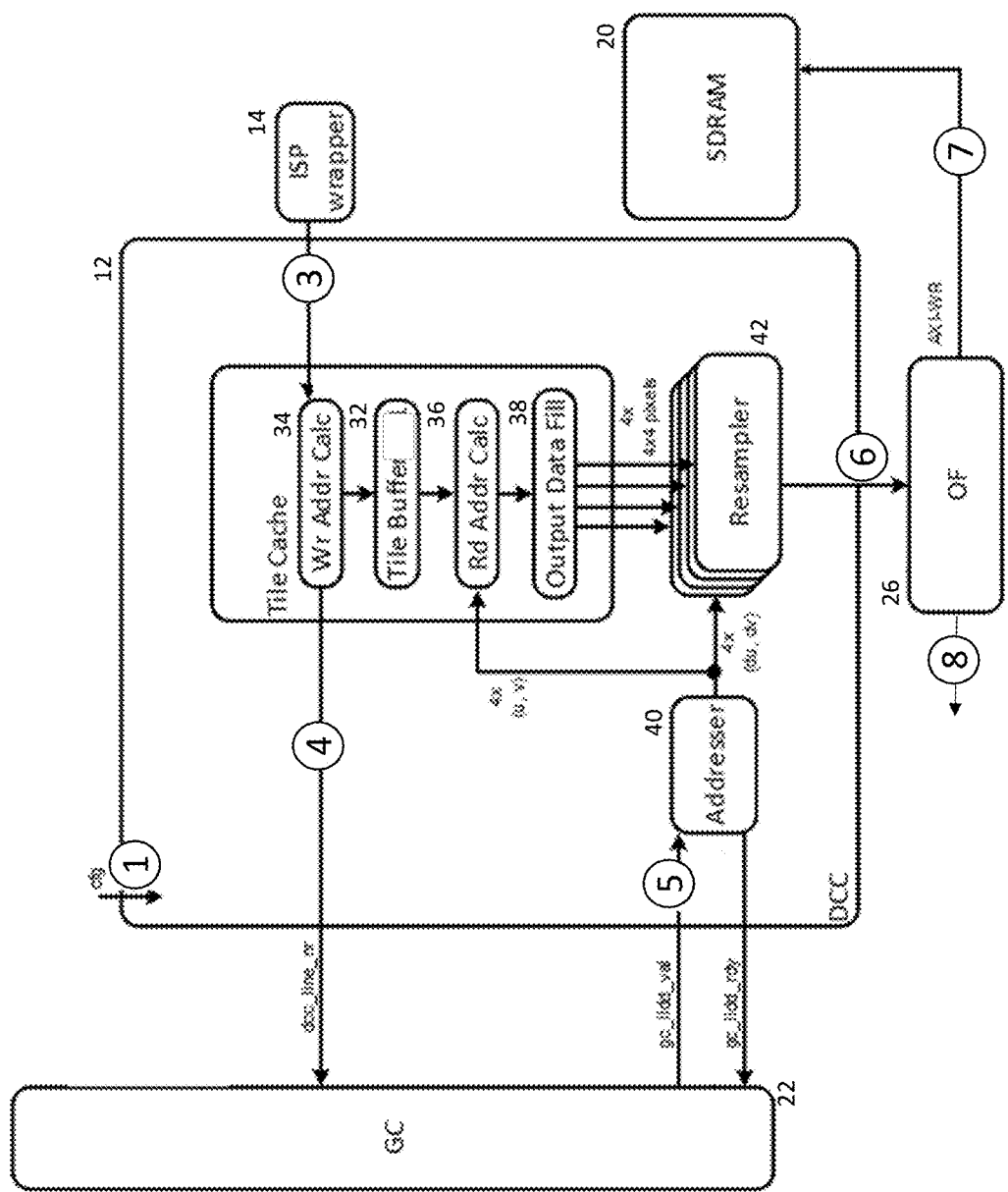
FIG. 5 illustrates a distortion correction core (DCC) component of the system of FIG. 3 in more detail.

In relation to FIG. 5, the DCC 12 comprises sub-blocks including:

Tile Buffer 32—a double buffered cache. In FIG. 5, the 0/1 designation indicates that the tile buffer 32 can be used in either of two modes: for storing tile information if operating as described in EP3101622 (Ref: FN-384-EP2); or for storing line information when obtaining image information directly from the ISP 14;

Wr_addr_calc 34—loads pixel information from the ISP 14 into the tile buffer 32, determining where to write information into the buffer 32 according to the operating mode of the system;

Resampler 42—in the embodiment, a bicubic resampler includes multiple individual resamplers 42, each producing an interpolated pixel from a respective 4×4 pixel window, with 4 interpolated pixels produced forming a 2×2 window to be output. Because all the input image pixel for a tile is available when interpolation is to be performed by the resamplers 42, there is no speed advantage to choosing linear interpolation as distinct from bicubic interpolation as described in EP3101622 (Ref: FN-384-EP2) when both are available. Thus, in the present embodiment, bicubic interpolation is performed because this is assumed to be available;

Addresser 40—as in EP3101622 (Ref: FN-384-EP2), knowing the distortion for a tile being processed, the addresser 40 can calculate a (u,v) coordinate in the input image corresponding to any pixel location in the output image. In the present embodiment, where multiple (4) color planes are processed simultaneously, the addresser 40 determines addresses of 4 4×4 pixel windows to be read from the Tile Buffer 32 corresponding to the (u,v) coordinates and provides these to a Rd_addr_calc 36 sub-block. As will be explained in more detail, the addresser 40 can also supply a sub-pixel displacement (du,dv) for an input image coordinate relative to an input image pixel to the resampler 42 to enable the resampler 42 to interpolate input image information appropriately;

Rd_addr_calc 36—reads input image pixels from the tile buffer 32;

Output_data_fill 38—outputs window data for interpolation by the resamplers 42.

Figure 6:
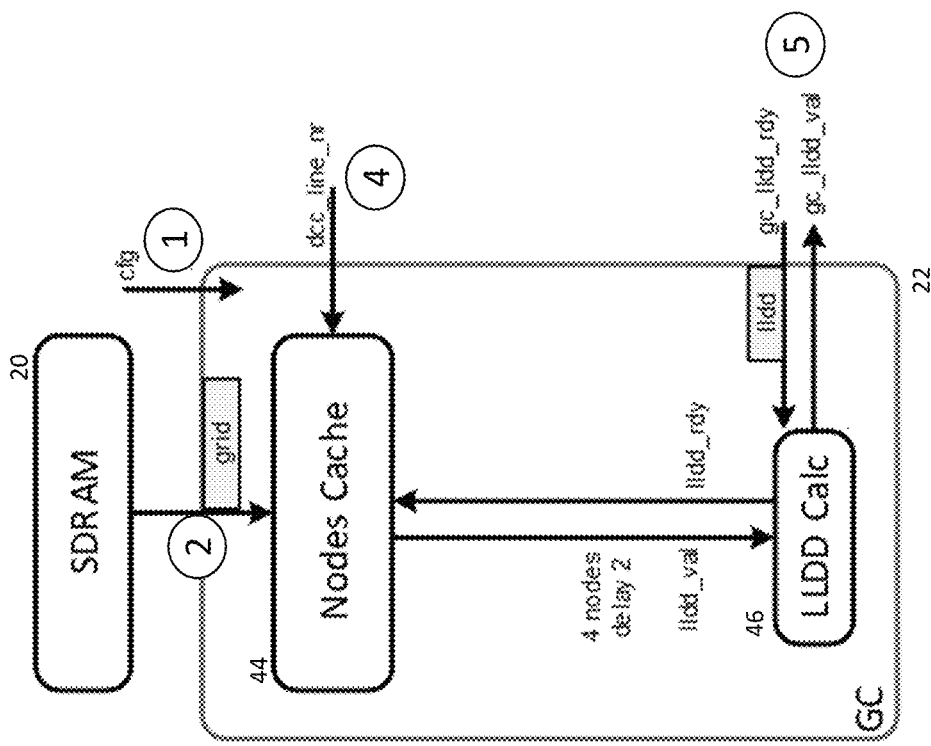
FIG. 6 illustrates a grid cache (GC) component of the system of FIG. 3 in more detail.

Turning now to the Grid Cache (GC) 22, which is shown in more detail in FIG. 6. The GC 22 reads grid nodes from a grid definition 24 in the SDRAM 20 and stores these in a node cache 44. It can be sufficient to store node information for as little as 2 or 3 rows of nodes within a grid at any given time, as once processing of the lines for an upper portion of an image have been processed, the grid information corresponding to these lines can be flushed from the cache 24, so reducing the required capacity for the cache 44. In any case, the grid definition essentially comprises the node coordinates for each tile of the grid. The DCC 12 updates the GC 22 every time a new image line is read, through a dcc_line_nr signal, and knowing the grid layout, the GC 22 can determine if the indicated image line has passed sufficiently below the lowest coordinate for a tile of a section of distorted line in an input image. In order to be able to interpolate a 4×4 window of pixels to provide a bicubic interpolated value for any given coordinate in the input image, line information from two lines in advance of the coordinate location is required in the tile buffer 32. If the resamplers 42 were only to perform bilinear interpolation, then only 2×2 windows of data would need to be provided by the output data fill block 38 and only 1 line of image information below the lowest coordinate for a tile of a line section would be required. This is taken into account by the GC 22 when determining from the dcc_line_nr signal supplied by the DCC 12 which line of the output image can be processed.

In any case, once the GC 22 determines that sufficient input image information for a line section is available, a low level distortion description (LLDD) calculation block 46, defines and provides an LLDD for each tile of the line section to be processed to the DCC 12. (LLDD can be provided one tile at a time, or the LLDDs for all the tiles of a line section could be provided at once.) In any case, once the DCC 12 has this information, it can map pixel information from a distorted tile within the input image being read from the ISP to a corrected pixel within a tile of the output image 20.

Referring now to FIG. 4, the LLDD defining the transformation of a given tile, defined by nodes 1-4 in output image space, back to a corresponding tile, defined by nodes (u1,v1) . . . (u4,v4), in input image space is illustrated. The LLDD includes:

dudx—U difference to a next pixel in a line;
dvdx—V difference to a next pixel in a line;
dudy—U difference from a start-of-line (SOL) pixel to a next SOL pixel;
dvdy—V difference from a start-of-line (SOL) pixel to a next SOL pixel;
output x,y pixel locations for an output image tile origin (node 1); and
corresponding input u,v coordinates (u1,v1) for an input image tile origin—as indicated above, in most cases, an input image coordinate corresponding to an output image pixel location will lie between input image pixel positions.

Note that the exemplary tile of FIG. 4 comprises 4×4 pixels, however the size of tile employed within any given implementation may vary. Also it is not necessary that tiles comprise the same number of rows and columns. Also, it is not necessary that the output image is divided into tiles of uniform size and so, for example, tiles located towards the centre of an image may be smaller than tiles located towards a periphery of an image. Nonetheless, it is useful that vertical sections be divided into integer numbers of tiles.

Referring back to FIG. 5, descriptors dudx, dvdx enable an addresser 40 within the DCC 12 to determine a displacement along a line of a distorted input image tile of an input image coordinate corresponding to a pixel within the body of an output image tile. On the other hand descriptors dudy, dvdy enable the addresser 40 to determine a row-to-row displacement within the distorted input tile of an input image coordinate corresponding to a pixel within the body of an output image tile. Thus, knowing the correspondences between node 1 and (u1,v1), the addresser 40 can determine the input image coordinate for any pixel of an output image tile. Alternatively, the descriptors dudx, dvdx, dudy, dvdy can enable the addresser 40 to iterate through an output image tile, line-by-line, row-by-row to determine each input image coordinate corresponding to an output image tile pixel location and to allow distortion correction information for a complete tile of an output image to be generated.

In any case, knowing an input image coordinate corresponding to an output image pixel location, the addresser 40 can determine the addresses in the buffer 32 for the 4×4 pixel window surrounding the input image coordinate and so enable an output data file block 38 to read this information from the buffer 32 and to provide the information to the resampler 42 which interpolates the 4×4 window information surrounding the input image coordinate to provide an interpolated value for an output image pixel.

As indicated, in the present embodiment, multiple resamplers 42 are provided to enable multiple color planes to be processed in parallel. Thus, 4 4×4 windows of pixels are provided to respective resamplers 42 per clk cycle. So, for example, in one embodiment where YCC422 or YCC420 images are being processed, 2 4×4 windows of Y pixels are read for every 4×4 window of Cr pixels and 4×4 window of Cb pixels from the tile buffer 32 to produce a 2×2 pixel to be written to an output formatter (OF) 26. If color spaces other than YCC or indeed other YCC formats were being processed, more or fewer resamplers 42 could be employed.

Nonetheless, for each pixel, the resampler 42 can operate as described in EP3101622 (Ref: FN-384-EP2) interpolating window information based on the input image coordinate location to provide respective output image pixel values.

It will also be appreciated that because entire lines of information are available in the tile buffer 32, the edge tracer or tile border extender employed in EP3101622 (Ref: FN-384-EP2) is not required when the DCC 12 is operating in the mode described herein.

In any case, once the DCC 12 has processed each pixel for an output image tile as required, it can signal back to the GC 12, that the LLDD for the next tile is required. This process can continue until the output image tiles corresponding to a line section from the output image have been processed.

At the output side of the DCC 12, the OF 26 accumulates corrected pixel information for a section of a line of the output image and once a section is complete, this is written to an output image 18 in memory 20.

Once a given line section is complete, if for the currently read input image line in tile buffer 32, it is possible to process another line section, the GC 22 as before begins to provide the DCC 12 with the LLDD for each tile of the next line section until that line section is complete and subsequently written by the OF 26 to memory 20.

Once all possible line sections than can be written for a given currently read input image line in the tile buffer 32 have been processed, the next line can be read into the tile buffer 32.

By knowing the grid layout for a distorted image, the GC 22 ensures that although corrected line sections may be written to memory 20 out of order, by the time reading of the distorted image is complete, the corrected output image 18 will be complete.

It will therefore be seen that the GC 22 determines the grid processing pipeline, as each time the DCC 12 completes the processing of a tile, the GC 22 provides the required LLDD for the next tile, and once the tiles for a line section are complete, the GC 22 provides the required LLDD for the tiles of the next line section. Thus, the DCC 12 does not need to be concerned with the overall distortion of the grid, it simply needs to correct the pixels for each LLDD provided by the GC 12. Equally the output formatter 26 needs only to acquire corrected pixels received from the resamplers 42 and once a particular line section is complete, write the information in a burst to memory 20.

Note that in the process described above, the DCC 12 is described as generating a line of pixels within each output tile and once all of the tiles for a line section have been processed, the line section is written to memory 20. In a variant of this approach, the DCC 12 could instead process all of the pixels for an output image tile so that output image information would be generated for a vertical section, one tile in depth, rather than just one row in depth.

This means that the GC 22 will need to wait until an image input line two rows past a bottom most coordinate for a lowest tile of a line section has been read, before the line section would be processed. Also, because a greater image-wise depth of information is being written to the output formatter before being written to memory, the length of line sections in this case may need to be shorter than if only information for one line section were being written to memory at a given time in accordance with the optimum burst size for writing from the OF 26 to memory 20.

Referring back to FIG. 3, the work flow for the DCE 10 is as follows:

Step Description

1 A CPU 50 configures the GC 22, DCE 10 and OF 26 modules by writing information directly to registers within these modules and then enables the DCE 10.

2 The GC 22 starts reading from the grid 24 stored in SDRAM 20 at least the first 2 lines of nodes of the grid and writes them to its internal nodes cache 44—the exact number depends on the maximum distortion. More lines of nodes will be loaded while the processing advances until all the lines of the input image have been read.

3 The ISP Wrapper 14 starts injecting a lens distorted input image line-by-line in normal raster order through a frame interface. In the embodiment, the Wr Addr Calc module 34 write the input image in YCC422 or YCC420 format to the tile buffer 32.

4 After each line is completely stored in the Tile Buffer 32, the DCC 12 informs the GC 22 about the number of lines currently available for processing by incrementing the dcc_line_nr signal indicating the number of lines of the input image currently received from the ISP wrapper 14.

5 When the dcc_line_nr signal indicates that a line segment of the output image can be processed, the GC 22 sends to the DCC 12 the LLDD for that segment.

6 The DCC 12 uses the LLDD including (u1,v1) to compute the read addresses of all the input image pixels needed for computing the output pixel values. For each output pixel, the addresser 40 calculates the addresses of 4 4×4 pixel windows and the (du,dv) parameters for the 4 resamplers 42. The 4 4×4 pixels windows are read from the tile buffer 32 and are sent to the 4 resamplers 42. The resamplers 42 calculate the resampled 4 output pixels and the signals for the output formatter 26 are assembled. These output formatter signals comprise pixel data from the resamplers 42; frame control signals from the addresser 40; and output grid information from the GC 22.

7 OF 26 receives line by line the output image from the DCC 12 and writes it to the SDRAM 20. The OF 26 receives the corrected information for an image, in the order of the possible processing, depending on the image distortion.

8 Processing ends when all the tiles of a grid have been processed by the DCC 12. OF 26 asserts an of_idle signal after the last pixel of the output image is written to SDRAM 20.

Figure 8:
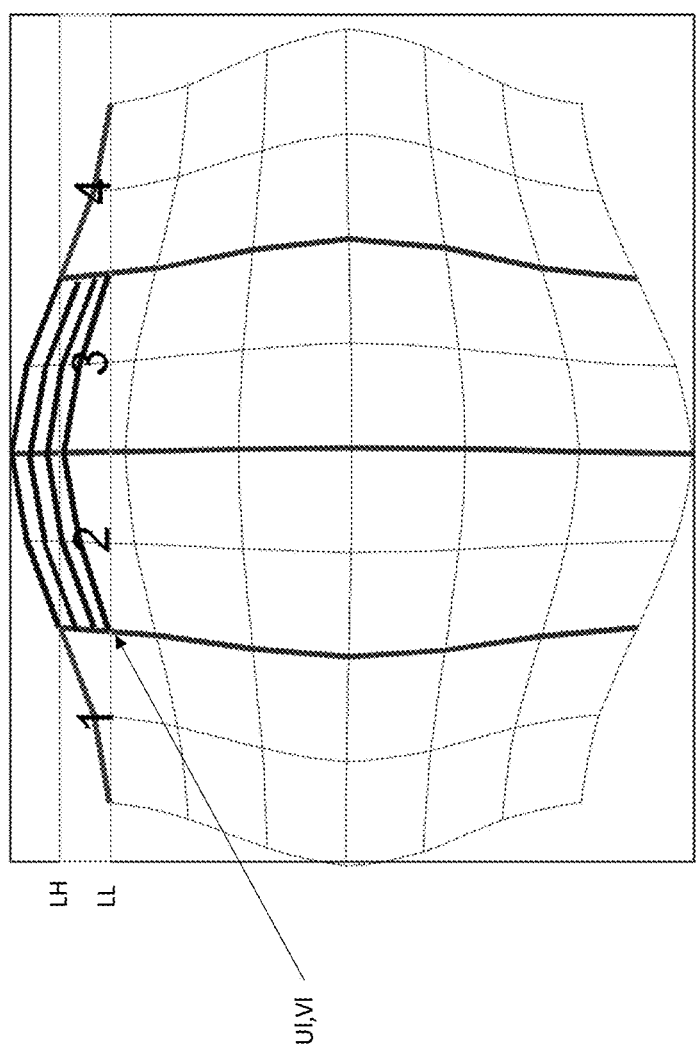
FIG. 8 illustrates processing of an exemplary image.

Referring to FIG. 8, in a first iteration, lines from sections 2 and 3 will be processed once sufficient lines (LH) for the input image have been read. Processing continues until enough input lines are available to process line segments from other grid sections. So by the time lines between input image lines LH-LL are in the tile buffer 32, and line LL is read, assuming that this is two row below the lowest coordinate of the line sections shown in sections 1-4, each of these line segments will be processed.

In the above example, correction for lens distortion correction only is performed. However, it will be appreciated that in other embodiments, as described in EP3101622 (Ref: FN-384-EP2), it could be possible to layer both affine and/or other global transformation grids over the local grid definition 24 stored in memory 20 to take into account other distortions which could be corrected for as an image is being read.

It will be appreciated that other functionality could be incorporated with the DCE 10 as appropriate. So for example, as corrected image information is being produced by the DCC 12, this could also be fed to a module (not shown) for generating a Histogram of Gradients (HOG) map for the corrected image—for example as described in WO 2017/198861 (Ref: FN-398-PCT2). The HOG map could be output in parallel with the corrected image so that the information could be immediately available for post-processing the corrected image.

It will be appreciated that the functional blocks illustrated in the above embodiment have been provided for exemplary purposes only and in variants of this embodiment, this functionality may be distributed differently as required.

The invention claimed is:

1. A method for correcting a distorted input image, comprising:
dividing an output image into an array of tiles, each tile comprising an array of pixels;
dividing said array of tiles into a plurality of vertical sections, each vertical section spanning a plurality of tiles;
determining a corresponding array of tiles in input image space, each tile in input image space corresponding to an output image tile transformed according to a distortion for a portion of an input image corresponding to said tile;
providing an input image buffer comprising sufficient storage space to accommodate pixel information for a plurality of lines of said input image sufficient to span a maximal vertical distortion of a section of an input image line spanning a vertical section;
receiving a line of input image information of the distorted input image directly from an image signal processor;
storing said line of input image information in said input image buffer, with said line of input image information spanning a line of said input image buffer;
responsive to receiving said line of input image information, determining if said received line of input image information is past a lowest portion of a section of a distorted line in said input image in said input image buffer;
responsive to said determination that said line of input image information is past said lowest portion of said section of said distorted line, providing distortion descriptors for each tile in input image space spanning said section of distorted line to a distortion correction core;

for each pixel of a line section in said output image corresponding to said section of distorted line:
determining a corresponding coordinate in input image space based on said provided distortion descriptors for the corresponding tile in input image space;
determining addresses in said input image buffer for a plurality of pixels in said input image surrounding said determined corresponding coordinate; and
interpolating pixel values at said determined addresses to provide an interpolated pixel value for said output image;

accumulating interpolated pixel values for a line section of said output image; and writing said interpolated pixel values in a burst to external memory, wherein determining that said line of input image information is past said lowest portion of a distorted line section comprises determining that said input image information is past a lowest portion of a section of a distorted line in said input image.

2. A method according to claim 1 wherein said addresses comprise addresses for a 4×4 window of pixels surrounding said coordinate; and wherein said interpolating comprises bicubic interpolation.

3. A method according to claim 1 wherein said addresses comprise addresses for a 2×2 window of pixels surrounding said coordinate; and wherein said interpolating comprises bilinear interpolation.

4. A method according to claim 3, wherein determining that said line of input image information is past said lowest portion of a distorted line section comprises determining that said input image information is one row past a lowest portion of a section of a distorted line in said input image.

5. A method according to claim 1 wherein each tile comprises an array of n×m pixels, where n is greater than or equal to 1 and m is greater than one.

6. A method according to claim 1 wherein each vertical section spans an integer number of tiles.

7. A method according to claim 1 wherein said input image comprises a plurality of color planes, said method comprising performing said steps of determining addresses in said input image buffer; and interpolating pixel values, in parallel for pixels in separate color planes of said input image.

8. A method according to claim 7 wherein said input image is in YCC format and wherein said method comprises performing said steps of determining addresses in said input image buffer; and interpolating pixel values, in parallel for 2 Y pixels and each of a Cr and Cb pixel.

9. A method according to claim 1 wherein said dividing comprises dividing said image into an array of equal sized tiles.

10. A method according to claim 1, further comprising receiving selection of said method as a mode of operation from among multiple available modes of operation in which said input image is stored in accessible memory and in which input image information is read from said memory tile-by-tile.

11. A method according to claim 1 wherein said distortion takes into account at least lens distortion in acquiring said input image.

12. A method according to claim 1 further comprising at any given time only storing a definition of said array of tiles in input image space corresponding to said portion of said input image stored in said input image buffer.

13. A system arranged to perform the method of claim 1 and comprising:
a grid cache for storing at least a portion of a definition of said array of tiles in input image space and for providing said distortion descriptors;
said distortion correction core for producing said interpolated pixel values; and
an output unit for writing said interpolated pixel values to external memory.

* * * * *